US007021028B2

(12) United States Patent
Hanten

(10) Patent No.: US 7,021,028 B2
(45) Date of Patent: Apr. 4, 2006

(54) PROCESS FOR THE PRODUCTION OF PORTION PACKS IN A TUBULAR FILM

(75) Inventor: Jürgen Hanten, Bad Nauheim (DE)

(73) Assignee: Poly-clip System GmbH & Co. KG, (DE)

( * ) Notice: Subject to any disclaimer, the term of this patent is extended or adjusted under 35 U.S.C. 154(b) by 14 days.

(21) Appl. No.: 10/836,310

(22) Filed: Apr. 30, 2004

(65) Prior Publication Data

US 2005/0000190 A1 Jan. 6, 2005

(30) Foreign Application Priority Data

May 3, 2003 (DE) ................................ 103 19 820

(51) Int. Cl.
*B65B 9/10* (2006.01)

(52) U.S. Cl. ............................ 53/450; 53/459; 53/469; 53/527; 53/550; 53/417; 53/138.2

(58) Field of Classification Search .................. 53/450, 53/451, 459, 469, 527, 550, 563, 575, 576, 53/417, 138.2
See application file for complete search history.

(56) References Cited

U.S. PATENT DOCUMENTS 2,686,725 A * 8/1954 Cornwell ................. 138/118.1
2,899,875 A * 8/1959 Leasure ....................... 493/468
2,969,627 A * 1/1961 Leasure ........................ 53/451
3,060,495 A * 10/1962 Muller ......................... 452/47
3,526,079 A * 9/1970 Maxeiner ..................... 53/551
4,043,098 A 8/1977 Putnam, Jr. et al.
4,353,196 A * 10/1982 Beer et al. ..................... 53/451
4,563,231 A * 1/1986 Porrmann et al. ............ 156/90
4,563,792 A * 1/1986 Niedecker ..................... 452/31
4,690,668 A * 9/1987 Rebmann et al. ........... 493/297
4,734,956 A * 4/1988 Frey et al. ............... 138/118.1
4,821,488 A * 4/1989 Donald ......................... 53/417
4,964,259 A * 10/1990 Ylvisaker et al. ............. 54/433
4,991,379 A * 2/1991 Boeckmann ................. 53/552

(Continued)

FOREIGN PATENT DOCUMENTS

DE 1 783 169 2/1959

(Continued)

OTHER PUBLICATIONS

European Search Report for Application No. EP 04 01 0321, Aug. 4, 2004.

*Primary Examiner*—Stephen F. Gerrity
*Assistant Examiner*—Hemant M. Desai
(74) *Attorney, Agent, or Firm*—Hahn Loeser & Parks, LLP; Robert J. Clark

(57) ABSTRACT

In a process for the production of portion packs of viscous to pasty filling material such as sausage meat, grease, putty or cement and the like in a tubular film (12) which is formed prior to introduction of the filling material (10) by welding or sealing of the longitudinal edges of a film strip (1) drawn off a supply and bent into a tubular form, and into which filling material portions are discontinuously introduced under pressure, whereupon the tubular film (12) is closed with braid formation, the tubular film (12) is drawn out of the welding or sealing station towards the filling station directly by the filling pressure and film strip (1) is subsequently drawn along from the supply into the welding or sealing station.

4 Claims, 1 Drawing Sheet

U.S. PATENT DOCUMENTS

| | | | | |
|---|---|---|---|---|
| 5,067,306 | A * | 11/1991 | Umezawa | 53/412 |
| 5,524,418 | A | 6/1996 | Thompson | |
| 6,182,421 | B1 * | 2/2001 | Sullivan | 53/438 |
| 6,216,425 | B1 * | 4/2001 | Hanten | 53/450 |
| 6,302,027 | B1 | 10/2001 | Compton et al. | |
| 6,718,735 | B1 * | 4/2004 | Lewis et al. | 53/425 |
| 6,794,053 | B1 * | 9/2004 | Quintin et al. | 428/516 |
| 6,813,871 | B1 * | 11/2004 | Kurth et al. | 53/551 |
| 2001/0039997 | A1 | 11/2001 | Zeuschner | |

FOREIGN PATENT DOCUMENTS

| | | | |
|---|---|---|---|
| DE | 1 144 174 | | 2/1963 |
| DE | 1 511 674 | | 8/1969 |
| DE | 24 30 774 | A1 | 1/1976 |
| DE | 90 11 155.9 | | 2/1991 |
| EP | 0 177 992 | A2 | 4/1986 |
| EP | 0 177 992 | B1 | 12/1988 |
| GB | 595797 | | 12/1947 |

* cited by examiner

PROCESS FOR THE PRODUCTION OF PORTION PACKS IN A TUBULAR FILM

This application claims the benefit of German patent application serial number 103 19 820.2-27, filed May 3, 2003, and is hereby incorporated by reference.

TECHNICAL FIELD

The invention concerns a process for the production of portion packs of viscous to pasty filling material such as sausage meat, grease, putty or cement and the like in a tubular film which is formed prior to introduction of the filling material by welding or sealing of the longitudinal edges of a film strip drawn off a supply and bent into a tubular form, and into which filling material portions are discontinuously introduced under pressure, whereupon the tubular film is closed with braid formation.

BACKGROUND OF THE INVENTION

It is known for the tubular casing required for the production of sausages or similar portion packs to be continuously produced in situ by longitudinal seam welding or sealing of a film strip which is bent into the tubular form. In the process of the general kind set forth which is known from EP 0 908 103 A1, the film strip is pulled through the welding or sealing station by advance drive means over a shaping shoulder. The shaping shoulder concentrically surrounds the filling tube which guides the filling material, and both the welding or sealing device and also the advance drive means operate against the filling tube. The tubular film which is formed in that way is conveyed by the advance drive means into a buffer station in which it is folded together in a harmonica-like configuration. On the other side of the buffer station it is drawn out of same upon filling of a portion into the tubular film which is closed at one end, through a sausage case brake device arranged at the mouth opening of the filling tube, until the filling operation in question is concluded and the portion can be closed.

That operating procedure is complicated and expensive in terms of apparatus and control technology because the operation of closing the tubular film and the filling operation have to be monitored and controlled independently of each other. For, due to a variation in the filling speed, the size of the portions and so forth, the requirement for tubular film in a unit of time fluctuates within relatively wide limits; however, adaptation of the continuous tubular film production speed is not possible or is very complicated and expensive, for a number of reasons.

SUMMARY OF THE INVENTION

It is this that the present invention seeks to remedy. It provides that the tubular film is drawn directly by the filling pressure out of the welding or sealing station towards the filling station and film strip is drawn thereafter from the supply into the welding or sealing station. In that way, there is automatically only ever as much tubular film produced, as is consumed in the filling operation. In that respect, continuous production of the tubular film is abandoned in favour of discontinuous production, but the stoppage times during the closing operations are generally so short (typically markedly less than 1 second) that there is no fear of overheating of the film material which is in the welding or sealing station. In addition, there is no need either for the separate advance drive means for pulling the closed tube out of the welding or sealing station and for drawing film strip from the supply. This procedure also eliminates the buffer supply which also frequently involved problems in terms of forming it and gradually running it down.

Accordingly it can be provided that welding or sealing of the longitudinal edges of the film strip is effected when it passes through the welding or sealing station during the introduction of filling material into the tubular film, wherein the longitudinal edges are joined in particular by means of a heating shoe which slides on them or by hot air which acts on them. It is also possible for the longitudinal edges to be joined by a heated, endlessly circulating belt which is entrained (driven) by the film edges by frictional engagement.

It is however also possible to proceed in such a way that welding or sealing of the longitudinal edges of the film strip is effected over a film strip length corresponding at least to the portion pack length only in the stopped condition of the tube and strip advance during stationary closure of the portion pack subsequently to the filling thereof, wherein advantageously a welding or sealing bar which is stationary with respect to the advance of the film strip but which is movable in perpendicular relationship therewith is pressed against the longitudinal edges of the film strip which is formed into the tube, during closure of a filled pack, and is lifted off again at the latest at the beginning of the operation of filling the next pack. Welding or sealing films in a stationary condition was admittedly known in connection with closing bags but not in regard to the production of a tubular film passing through the apparatus.

Further subject-matter of the invention is an apparatus for carrying out the process according to the invention, comprising a filling tube connected to a filling machine, a shaping shoulder concentrically surrounding the filling tube for shaping a tubular film drawn off a supply roll into the tubular shape, a welding or sealing device for connecting together the adjacent longitudinal edges of the tubular film on the filling tube, and a tying-off and closing device arranged in the ejection direction downstream of the mouth opening of the filling tube, for the tubular film, downstream of each finished filled pack, wherein the welding or sealing device has a welding or sealing bar which is movable radially with respect to the filling tube and of a minimum length corresponding to the overall length of the pack and the closure portion. Alternatively it is possible to use a stationary heating shoe which can be applied in sliding relationship to the longitudinal edges of the flat film, a stationary hot air source which can be directed against the longitudinal edges of the flat, or a heating belt which circulates freely between two direction-changing rollers and which can be applied with its one run to the longitudinal edges of the flat film.

BRIEF DESCRIPTION OF THE DRAWINGS

The drawing shows the invention by means of diagrammatically illustrated embodiments of the parts involved of a filling apparatus. In the drawing:

DETAILED DESCRIPTION OF THE INVENTION

Figure 1:
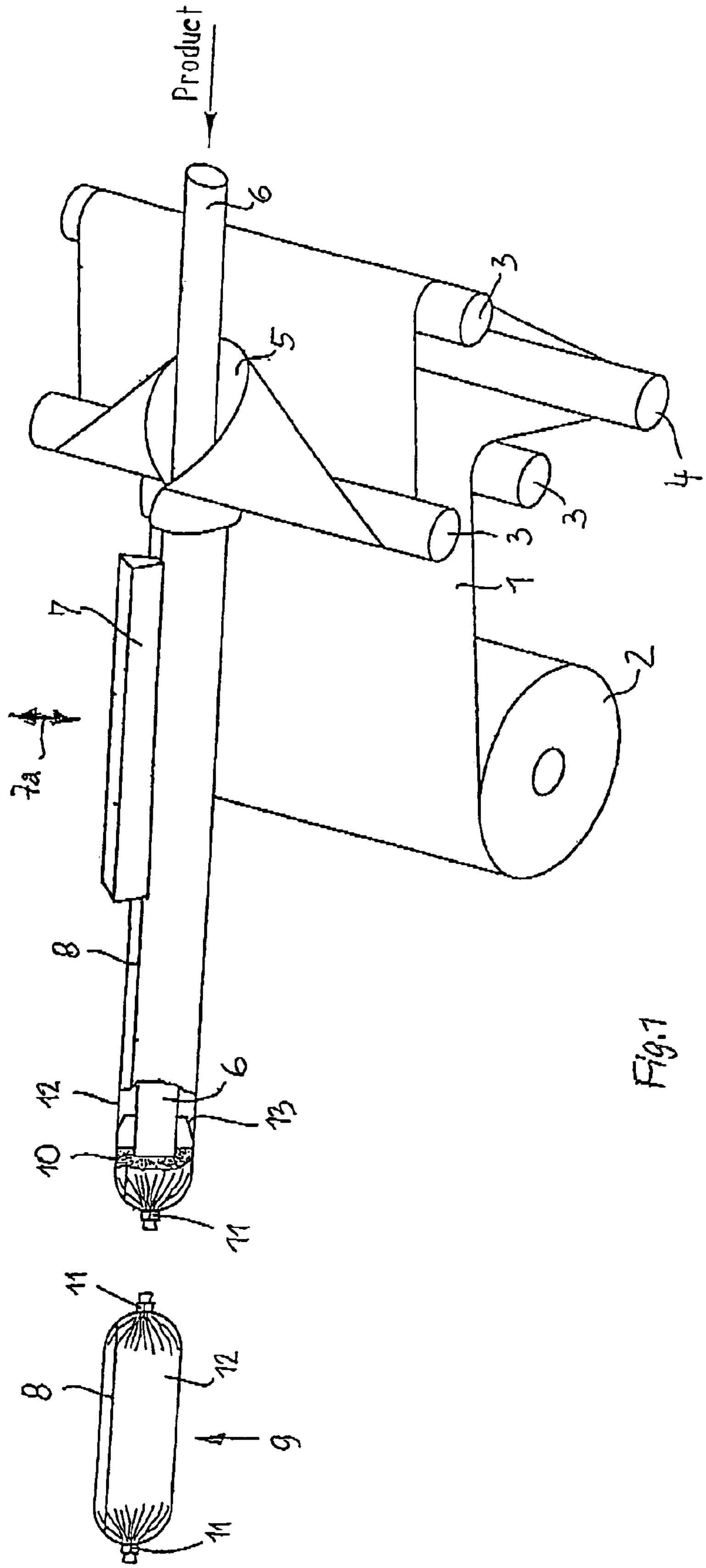
FIG. 1 shows the apparatus with a welding or sealing bar which can be lifted off.

In all cases, film strip 1 is drawn off a supply in the form of a roll 2 and fed by way of direction-changing rollers 3 and a tensioning roller 4 to a shaping shoulder 5, by means of which the film strip 1 is bent into the tubular shape in concentric relationship with a filling tube 6. The longitudinal edges of the film strip 1, which are brought together, are welded or sealed to form the seam 8. The bar 7 is heated in a manner not shown herein and, for the closing operation, pressed against the longitudinal edges of the film strip 1.

The latter occurs when closing (and possibly cutting off) a finished pack 9; that operation is illustrated in FIG. 1 of EP 0 908 103 A1 while the drawings attached hereto show filling of the next portion pack. Filling material 10 is urged out of the mouth opening of the filling tube 6 into the tubular film 12 which is closed at one end by the clip 11. In that way tubular film 12 is subsequently pulled along by way of a sausage case brake device 13 (here being disposed at an internal position), but not more than is needed for the respectively filled and closed pack. As soon as the portion of filling material—which is possibly previously measured off in the filling machine (not shown)—is ejected, the filling operation—possibly very short—is stopped and the closing procedure takes place. In that time the next portion to be filled can possibly be measured off and prepared in the filling machine.

In the apparatus diagrammatically illustrated in FIG. 1 the welding or sealing station substantially comprises a heated sealing bar 7 which—as indicated by the arrow 7*a*—can be lifted off its condition of bearing against the longitudinal edges of the film strip 1, which have been brought together. In operation, the radial movement of the sealing bar 7, which is related to the filling tube 6, is controlled in such a way that it is pressed against the longitudinal edges of the film strip whenever tubular film 12 is being pulled off the filling tube 6 during the operation of filling a pack 9 and therefore film strip 1 is pulled along from the supply roll 2 while the sealing bar 7 is lifted off when a filling operation is concluded and the tubular film 12 has been constricted for closure purposes by means of clips 11 to form a braid, between two successive packs 9. The length of the sealing bar 7 corresponds at least to the length of tubular film 12, required for a pack 9 and the closed ends thereof.

The invention claimed is:

1. A process for the production of portion packs of viscous to pasty filling material in a tubular film, the process comprising the steps of:

a) filling a previously formed portion of tubular film having a previously closed first end with a filling material introduced under pressure by filling means at a filling station;

b) drawing a film strip portion, having a pair of longitudinal ends, off a supply toward a welding station and bending the film strip portion into a tubular form, wherein the step of drawing the film strip portion off the supply is accomplished only by the pressurized filling of the tubular film which is attached to the film strip;

c) stopping the pressurized filling of the tubular film by stopping the filling means when a predetermined amount of filling material has been introduced into the tubular film;

d) forming a portion pack of a predetermined length by closing the tubular film with a braid formation at a predetermined distance from the first closed end of the tubular film while the pressurized filling is stopped;

e) welding or sealing the longitudinal ends of the film strip portion to form an additional portion of tubular film while the pressurized filling is stopped, wherein the step of welding and sealing the longitudinal ends of the film strip portion is accomplished over a film strip length corresponding at least to the portion pack length.

2. The process of claim 1, wherein the step of welding or sealing the longitudinal ends of the film strip portion comprises the steps of:

pressing a welding or sealing bar against the longitudinal edges of the film strip portion that has been bent into a tubular form; and lifting the welding or sealing bar when the longitudinal edges of the film strip are welded or sealed together.

3. The process of claim 2, wherein the step of pressing the welding or sealing bar is accomplished by the following steps:

positioning the bar in a parallel relationship with the longitudinal ends of the film strip that has been bent into tubular form and in a fixed longitudinal position with respect to the movement of the film strip into and out of the welding station;

moving the bar radially toward the longitudinal ends of the film strip until the bar contacts at least one of the longitudinal ends; and welding or sealing the longitudinal ends of the film strip to each other.

4. The process of claim 2, wherein the step of lifting the welding or sealing bar is accomplished by the following steps:

moving the bar radially away from the welded or sealed longitudinal ends of the tubular film to a position where the bar is in a parallel relationship with the tubular film.

* * * * *